Figure 1:
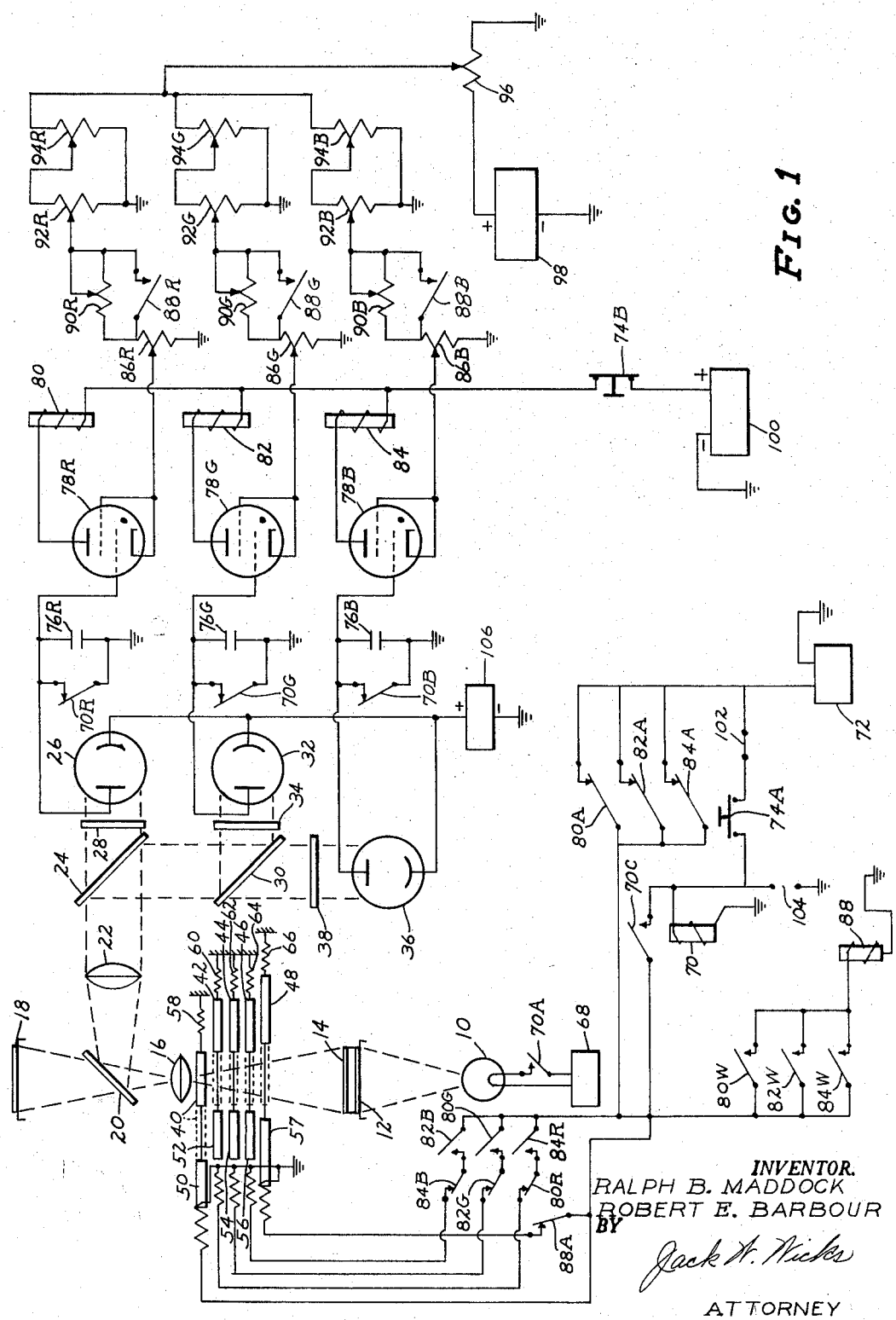

INVENTOR.
RALPH B. MADDOCK
ROBERT E. BARBOUR
BY
ATTORNEY

3,293,033
METHOD FOR CONTROLLING EXPOSURE IN A PHOTOGRAPHIC COLOR PRINTER
Ralph B. Maddock and Robert E. Barbour, Minneapolis, Minn., assignors to Pako Corporation, Minneapolis, Minn.
Filed Jan. 18, 1960, Ser. No. 3,075
4 Claims. (Cl. 96—23)

Our invention relates to an improvement in a photographic color printing apparatus, and it is an object of our invention to provide a printer having means for exposing all the multiple emulsions of the sensitized material for a portion of the exposure and means for further exposing the multi-sensitive material sequentially to light which affects only one of the emulsions at a time, during the remainder of the exposure.

It is also an object of this invention to provide means for producing a satisfactory print in a minimum of exposure time from materials varying in the relative speeds of the multiple emulsion sensitivities thereof which means includes a basic tinting filter for varying the light output of a multiple color (white) source to a predominance of a color or colors which complements the emulsion sensitivity characteristic of the particular batch of sensitized material being used together with means for removing this basic tinting filter at the termination of the white light exposure.

We have found that when narrow band color filters are used in the sampling device some variable characteristic must be provided to modify the control of the timer when the printing light is changed from a wide band white light to a narrow band colored light for the purpose of maintaining a constant net exposure regardless of the ratio of wide band white light to narrow band colored light, for the emulsions of the sensitized material have sensitivities in a broader band than is transmitted by a narrow band colored filter. Thus, it is an object to provide voltage varying means for extending required exposure simultaneously with the introduction of a narrow band color filter into the printing light path.

Broadly the use of a white light source in a color printer to simultaneously expose the multiple emulsions of a color printing material is well known in the art. Various methods and devices have been employed to control the overall exposure and obtain a proper color in the finished print which include the use of a suitable color tinting filter or filters during the entire exposure, this exact tint determined empirically by test exposures. Also the negative may be prejudged and suitable photoelectric devices may be used to automatically select the proper color tinting filter to be used. In addition, are found fully automatic devices which simultaneously measure the exposure of all three of the primary colors and selectively modify the color of the printing light by suitable means, usually filters placed near the lens in the path of the printing light. These automatic devices can be further classified into three basic types; first, a three color sequential or "additive" system using sequential exposure to narrow bands of red, green, and blue light; second, the system referred to as the "subtractive" system which uses an initial white light exposure and particular primary colors of this white light are selectively terminated by placing the appropriate complementary filter in the light path; and thirdly, the system which uses an initial white light to complete the requirement of one or more of the three primary colors and to partially complete the requirement of the remaining color(s) and following with a sequential exposure to narrow band primary colors required to complete the remaining color requirement. This last method is more completely described in a copending application, Serial No. 815,695, now U.S. Patent No. 3,241,441.

This present application is concerned with improvements in the white light exposure plus sequential primary color light exposure method. Our improvements operate to reduce the overall exposure time and to maintain a more consistent print color for a variety of negatives.

In a negative process of color printing with which we are here concerned, material is used having three basic sensitivities in the red, green and blue area of the spectrum. The exposure of the sensitized material to a primary color will cause the dye to develop out to produce the image in a color complementary to the exposing light and of a density corresponding to the amount of exposure. Conversely, the exposure to a complementary color (containing two primaries) will produce two complementary colors in the image, and thus the appropriate primary color is apparent in the print.

The relative sensitivities of the materials for printing vary substantially in magnitude, and the wavelength band for each color is quite broad although a peak does occur in the desired range for each emulsion. The relative and absolute sensitivities of a particular sensitized material may vary appreciably from batch to batch as will the ratio of sensitivities between emulsions on a particular material. We have found that some provision for accommodation of these variations must be made in the control section of an automatic printer, usually by an adjustment of an electrode voltage somewhere within the photoelectronic control circuit to produce an adjustment of the time produced by a negative of a particular density.

In the white light plus primary color method the exposure subsequent to the white light may be made through a series of filters, red, green and blue. Transmission characteristics of a typical set of filters show a narrow band peaked transmission in each primary color area. The relative exposure of a particular emulsion to light passing through one of the filters as compared to exposure of the same emulsion (emulsion here refers to only one of the three) to the same light source without the filter is considerably different. Although a number of other factors including the source output characteristic and the transmission characteristic of any devices in the light stream will have an effect on the precise value of the difference in exposure with the white light or colored light, the difference in area under the sensitivity characteristic curve and the filter transmission characteristic is a major factor in this exposure difference. In a practical situation this area difference, the apparent effective emulsion sensitivity, may be as much as two or three to one.

In order to produce a print of acceptable color balance the color of the printing light must be controlled by terminating the white light at the time the requirement of any one of the three colors is completed and follow with needed additional exposure to the remaining color or colors by placing an appropriate filter or filters in the light path. The possibility of simultaneous completion of more than one of the three colors exposure requirement is a definite and desirable possibility in producing a print in a minimum time. The factors affecting the time required for each of the exposures are the color content of the printing light, the transmission characteristic of the negative being printed, and the sensitivity characteristics of the emulsions of the sensitized material. If we temporarily assume the negative as a constant we leave the light source and the emulsion as variables. When the light source color is constant it follows that the exposure times will be related directly to the emulsion characteristics which are quite variable from batch to batch of material. Due to the differences in relative exposure during the white light and colored light portions of the exposure, the colored light is considerably less efficient and requires a longer time for the same net exposure. A white light source of exactly the right balance among the three primary colors would produce a simultaneous completion of the requirement of all three colors.

If we were to vary the color balance of the light source in inverse relationship to the emulsion sensitivities, we can produce a simultaneous completion of all exposures for any set of emulsion characteristics. This modification of the source balance can be accomplished by selection, for example, of the proper Eastman Kodak Wratten CC or CP series color filter or filters hereinbefore referred to as a basic tinting filter. The use of the proper color filter will produce an optimum exposure time for a particular emulsion and an average negative. This last item, negative transmission characteristic, was assumed a constant for the explanation of the method only for clarity. Variations in negative color should be considered. If a particular light source color modifying filter has been chosen for a given emulsion and standard negative characteristic to produce an optimum exposure, a negative which varies from the normal could result in an exposure which is longer with the corrective filter than without it, for example: We propose that if a red tinting filter were selected and an optimum exposure produced with an average negative which was neutral gray balance, a predominantly red negative would result in a shorter than normal white light exposure and a lengthened green and blue exposure as they must print through the red tinting filter. The present improvement includes as an object the use of suitable means for removing this tinting filter from the light path at the termination of the white light portion of the exposure and thereby reduce the time required for the subsequent individual colors as all the light of the needed color produced by the source is utilized and none absorbed either by the color density or neutral density of the tinting filter.

Another factor in the control of an automatic printer is in the relative sensitivities of the photoelectric measuring devices and the sensitivities of the emulsions used. Filters having transmission characteristics of narrow bands of red, green and blue are used in the light sampling section of the control portion of a printer. These filters are similar in their transmission characteristics to the printing light modifying filters used for exposure subsequent to the white light exposure. The photocells in the measuring device are then responsive only to the narrow band of light admitted to each by the filters, this, regardless of the printing light being wide band or white light or narrow band light produced by a similar filter in the printing light path. Thus the photocell sampling device cannot distinguish between the wide band white and the narrow band colored portion of the exposure. The sensitized material, however receives a grossly different exposure for an equal time of white vs. colored light. It can be seen that with negatives of different characteristics the ratio of the white light exposure to the color can change appreciably and that the sampling device is unable to evaluate this ratio and control accordingly.

While it is possible in the case of a sequential primary color printer heretofore mentioned to select certain photocell sensitivities and filter transmission characteristics to closely match the characteristics of the sampling devices and the emulsions, we have provided sampling device means of variable sensitivity for use with combined white and colored exposure. It is an object of this invention to provide controllable means which operates to vary the time requirement of a particular color exposure depending on whether the printing light is white or colored. Such control means operates to produce a resulting constant net exposure for a particular negative density regardless of the ratio of white light portion of the exposure to the colored light portion.

The invention will appear more clearly from the following detailed description taken in connection with the accompanying drawings, showing by way of example a preferred embodiment of the inventive idea wherein like numerals refer to like parts throughout.

Figure 2:
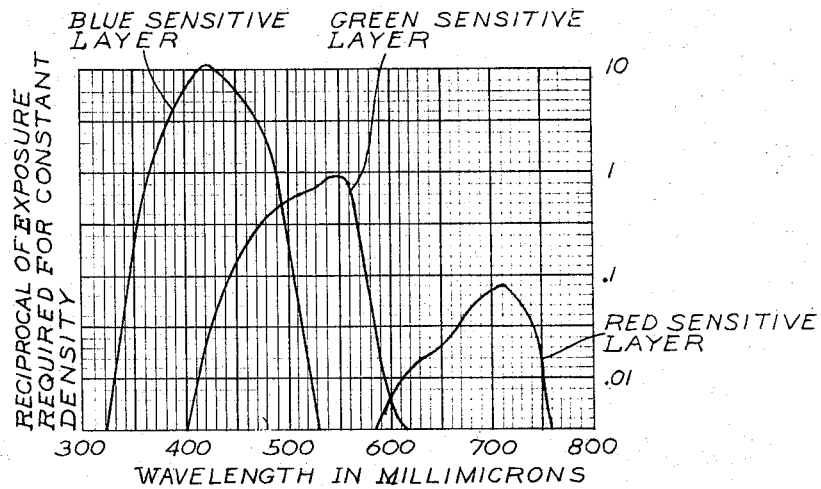
Figure 3:
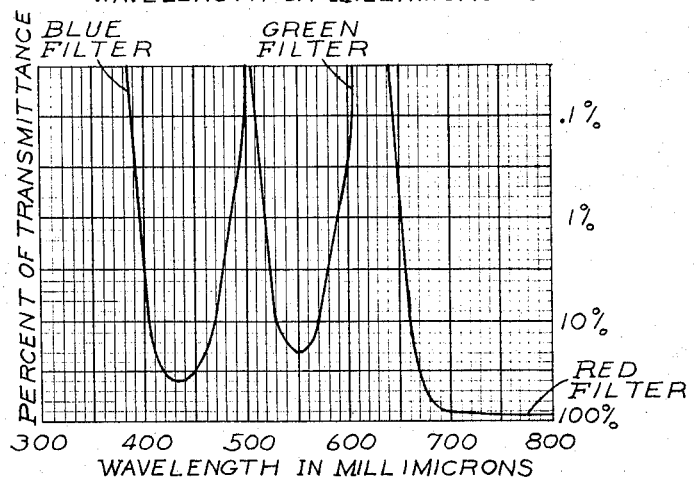
Figure 4:
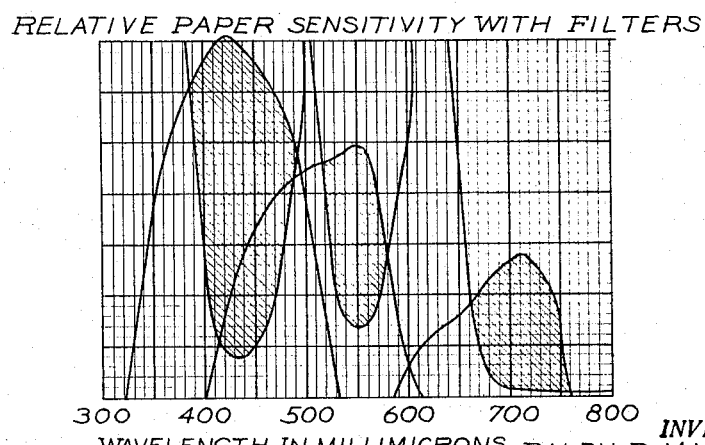

In the drawings forming part of this application:
FIGURE 1 is a diagrammatic presentation of our invention.
FIGURE 2 is a graphic presentation of a typical three color emulsion characteristic.
FIGURE 3 is a graphic presentation of a typical set of primary color filters.
FIGURE 4 is a graphic presentation of the superimposition of the graph of FIGURE 2 upon the graph of FIGURE 3, the shaded areas defining overlapping characteristics.

Referring to the drawings in detail and FIGURE 1 in particular, the numeral 10 designates a white light source which is positioned below the negative support indicated as 12 which supports the negative indicated as 14. Suitably supported above the negative support 12 is the lens 16 which forms an image of the negative 14 on the sensitized material 18 suitably supported above the lens 16. A first beam splitter 20 is positioned and supported so that a portion of the light from the lens 16 is directed to the lens 22 and thence to a second beam splitter 24 which directs portions of the light to red sensitive photocell 26 through red filter 28 and a portion of the light to a third beam splitter 30 which in turn directs a portion of the light to the green sensitive photocell 32 through the green filter 34 and a portion of the light to the blue sensitive photocell 36 through the blue filter 38.

Suitably positioned in the light path between the light source 10 and the lens 16 is the opaque shutter 40, the red filter 42, the green filter 44, the blue filter 46, and the basic tinting filter 48 all of which are positioned in the light path by solenoids 50, 52, 54, 56 and 57, respectfully. We further provide the springs 60, 62, 64 and 66 which bias the filters 42, 44, 46 and 48 respectfully in a position out of the light path when the respective solenoids 52, 54, 56 and 57 are not energized. The shutter 40 is normally biased into the light path by the spring 58 and is removed from the light path when the solenoid 50 is energized.

The light source 10 is powered by the lamp power source 68 and is controlled by the normally open contacts 70A on the cycle control relay 70. For purposes of clarification contacts associated with or operated by a particular coil are labeled with the same number but a distinctive suffix letter. Cycle control relay 70 is powered by control power source 72 and controlled by cycle start switch 74A. Photocells 26, 32 and 36 receive a portion of the printing light and allow a current flow into capacitors 76R, 76G, and 76B which is proportional to the amount of light reaching the respective photocells. Thus the charge accumulated by capacitor 76R is proportional to the amount of red light transmitted by the negative image 14. The normally closed contacts 70R, 70G, and 70B on cycle control relay 70 are connected across the capacitors 76R, 76G, and 76B in a manner which short circuits these capacitors when the cycle control relay 70 is deenergized.

Each of the three color timer circuits are identical and contain the following numbered circuit elements with a suffix letter R, G, or B to identify a red, green or blue circuit. Each circuit contains a thyratron 78, a bias adjustment potentiometer 86, a color vs. white exposure ratio control potentiometer 90, a calibrated color correction control potentiometer 92, an emulsion sensitivity control potentiometer 94. The red circuit also includes control relay 80, the green circuit also includes a control relay 82, and the blue circuit includes a control relay 84. A white light control relay 88 is energized by closing the normally open contacts 80W, 82W or 84W on relays 80, 82, and 84 respectively. A normally closed contact 88A on the white light control relay 88 when opened removes power from solenoid 57 when the relay 88 is energized. This in turn allows spring 66 to remove the basic tinting filter 48 from the light path. The control power source 72 supplies power to solenoids 50, 52, 54 and 56 through appropriate contacts 80R, 80G, 82G, 82B, 84R and 84B and 70C on relays 80, 82, 84 and 70. Connections 102 and 104 are provided which may be used for interlocking connection with the circuitry of an automatic sensitized material transporting mechanism which may used in connection with the automatic exposure control on photographic printers. Contacts 80A, 82A, and 84A on relays 80, 82, and 84 disconnect power source 72 from cycle control relay 70 at appropriate times to terminate cycle as hereinafter described.

An overall density control potentiometer 96 is provided to vary the bias on all three thyratrons 78R, G, and B simultaneously. The power supply 98 supplies bias voltage to all three timer circuits through appropriate potentiometers. The thyratrons 78R, G, and B are supplied with anode power by supply 100 which also supplies power for operation of relays 80, 82 and 84.

Cycle start switch 74B is provided to interrupt current flow from anode supply 100 and thereby extinguish thyratrons 78R, 78G, and 78B at the start of the cycle. Operating current for photocells 26, 32 and 36 is supplied by a power supply 106.

As explained hereinafter in detail the operation of the device will produce an exposure, the initial portion of which will cause the basic tinting filter 48 to be placed in the light path until the exposure requirement of one of the three colors is complete, at which time the basic tinting filter 48 will be removed from the light path, and one of the primary color filters is placed in the light path for the next portion of the exposure. When this second color's exposure requirement is complete, its filter is removed, and the filter of the remaining color is placed in the light path until this last color exposure requirement is completed. At this time the opaque shutter is placed in the light path thus terminating the exposure. At the time the white light tinting filter 48 is removed, the white light control relay 88 is energized, and the bias on all three control circuits is modified to compensate for the differences in effective emulsion sensitivity when white and colored exposures are used. FIGURE 2 graphically illustrates the relative sensitivity characteristic of a typical tricolor sensitive material. FIGURE 3 graphically illustrates the transmission characteristic of a typical set of color filters used as printing filters 42, 44, 46 and sampling filters 28, 34, and 38. FIGURE 4 shows FIGURE 2 superimposed upon FIGURE 3, the shaded area representing the area of emulsion sensitivity to colored printing light as transmitted by the color filters of FIGURE 3. The difference in area of the shaded portion of FIGURE 4 and the total areas of FIGURE 2 represents the effective emulsion sensitivity change from white to colored light. As the photocells 26, 32, and 36 are always receiving the narrow band light as transmitted by filters 28, 34, and 38, the reduction in a particular color control characteristic is affected only by the additional attenuation of the additional filter 42, 44, or 46, within the narrow band already seen by the photocell 26, 32, or 36. The sensitized material however has a considerably different change in relative sensitivity when the narrow band printing filter 42, 44, or 46 is introduced into the light path. When any one of the filters 42, 44, and 46 is introduced into the light path, the white light control relay 88 is energized which closes normally open contacts 88R, 88G, and 88B, which increases the bias voltage on thyratrons 78R, 78G, and 78B by removing potentiometers 90R, 90G, and 90B from the circuit.

The ratio of bias increase is selected by the initial resistance setting of potentiometers 90R, 90G, and 90B. This bias increase has the effect of simulating a change in the sensitivity of photocells 26, 32, and 36 when the band width of the printing light is changed and approximately the same density image on the sensitized material can be maintained irrespective of the relative portions of wide band white light exposure and narrow band color exposure. This in effect operates to electrically modify the timer circuit according to the optical modification of the emulsion sensitivity of the sensitized material due to the introduction of narrow band filters into the white light exposure.

Referring to the FIGURE 1 a typical exposure cycle is as follows:

Assume a steady state, at rest, condition of the circuit in which the thyratrons 78 are conducting, with relays 80, 82, and 84 energized, cycle control relay 70 deenergized and all other relays and solenoids de-energized. When the cycle start switch 74A and 74B is momentarily operated, the normally closed contacts 74B open and the thyratrons 78R, 78G, and 78B are extinguished, the normally open contacts 74A are closed which connect controlpower source 72 to the coil of the cycle control relay 70. The normally open contacts 70C on cycle control relay 70 close and supply hold-in power to relay 70 through the normally closed contacts 80A, 82A, or 84A on color control relays 80, 82 and 84. Contacts 70C supply power through normally closed contacts 88A on the white light control relay 88 to solenoid 57 which places the basic tint filter 48 in the light path. The contacts 70A on relay 70 connect power source 68 to light source 10, and the contacts 70C also supply control power from source 72 to solenoid 50 which removes the opaque shutter 40 from the light path. The light from source 10 now passes through image 14, filter 48, lens 16 and beam splitter 20 thence to sensitized material 18. The material 18 now receives light of all three colors, and a portion of this light is directed to the photocells 26, 32, and 36 by beam splitters 20, 24 and 30 and through filters 28, 34, and 38. The cell 26 receives only the red portion of the light sample as transmitted by red filter 28. The cell 32 receives only the green portion of the light sample as transmitted by green filter 34, and the cell 36 receives only the blue portion of the light sample as transmitted by blue filter 38. The normally closed contacts 70R, 70G, and 70B are open and capacitors 76R, 76G, and 76B accumulate a charge proportional to the red, green and blue components respectively of the light sample.

Depending upon the potential at the moving arm of bias adjustment potentiometers 86R, 86G, and 86B and the relative values of red, green and blue light transmitted by the image, one or more of the capacitors 76R, 76G, or 76B will reach a potential where its respective thyratron 78R, 78G, or 78B will conduct and relay 80, 82, or 84, respectively will operate. For this present cycle example we will assume the red exposure requirement has first been fulfilled and the capacitor 76R has reached a potential which allows thyratron 78R to conduct and thereby energize relay 80. Normally open contacts 80W connect control power source to white light relay 88, normally closed contacts 88A are opened, and control power source 72 is disconnected from solenoid 57 which allows spring 66 to remove the basic tinting filter 48 from the light path.

The normally open contacts 80G close and connect the control power source 72 through the normally closed contacts 82G to solenoid 54 which places green printing filter 44 in the light path for the next portion of the exposure. As this filter 44 transmits only green light the cell 32 continues to receive a portion of this green light, and capacitor 76G continues to accumulate a charge proportional to the printing light. The green sensitive emulsion of the sensitized material 18 also continues to receive the green light transmitted by the filter 44. As only a portion of the green sensitive area of the sensitized material as illustrated in FIGURE 2, is contained in the transmission characteristic of green filter 44 as illustrated in FIGURE 3, the apparent sensitivity of the green sensitive emulsion is reduced, as illustrated by the shaded area of FIGURE 4. To compensate for this reduction in effective emulsion sensitivity, normally open contacts 88G on the white light relay 88 are closed, and the potentiometer 90G is shorted out thereby increasing the potential applied to bias adjustment potentiomeer 86G which increases the firing potential of thyratron 78G which in turn requires additional green light to be received by cell 32 and additional charge accumulated in capacitor 76G. Thus the required exposure to the narrow band green light is adjusted to compensate for the effective sensitivity change of the sensitized material caused by a change in band width of the printing light.

When sufficient green light has been received by the cell 32, the capacitor 76G will reach the potential required to allow thyratron 78G to conduct and relay 82 operates. The normally closed contacts 82G are opened which disconnect power source 72 from solenoid 54 allowing spring 62 to remove green filter 44 from the light path. Normally open contacts 82B are closed which connects power source 72 to solenoid 56 through normally closed contacts 84B thus energizing solenoid 56 and placing blue filter 48 in the light path. The cell 36 now receives a portion of this blue printing light transmitted by the blue filter 48 and blue filter 38. At this time capacitor 76B resumes accumulating a charge porportional to the blue printing light. The bias on thyratron 78B was increased at the beginning of the previous green light portion of the exposure when the white relay 88 operated, and the normally open contacts 88B closed thereby shorting potentiometer 90B and increasing the potential applied to bias adjustment potentiometer 86B. Thus the adjustment for the blue vs. white light effective relative emulsion sensitivity is made by increasing bias on blue thyratron and hence requiring capacitor 76B to accumulate additional charge which in turn requires a longer exposure to blue light as sampled by cell 78B. When cell 78B has received sufficient blue light, capacitor 76B will reach a potential which will allow thyratron 78B to conduct and operate relay 84. The normally closed contacts 84B open and power source 72 is disconnected from solenoid 56 which allows spring 64 to remove blue filter 46 from the light path. The normally closed contacts 84A open and remove holding circuit power from source 72 to relay 70 and relay 70 is deenergized. The normally closed contacts 80A and 82A which are connected in parallel with contacts 84A were opened at the end of the white light and green light portions of the exposure, hence the last of the three contacts to open, 84A, controls the end of the cycle. When relay 70 is deenergized normally open contacts 70A remove power from source 68 to light source 10. Power from source 72 is removed from relay 88 and solenoid 50, allowing spring 58 to place opaque shutter 40 into the light path thereby ending the exposure.

While the red circuit was selected to first operate in this typical cycle, it is readily apparent that any of the three circuits may operate first and the sequence would be white, blue, red, if the green exposure requirement was completed first, and the sequence would be white, red, green if the blue exposure requirement was completed first.

The invention is not to be understood as restricted to the details set forth since these may be modified within the scope of the appended claims without departing from the spirit and scope of the invention.

Having thus described the invention, what we claim as new and desire to secure by Letters Patent is:

1. The method of exposing a photographic multicolor sensitized material from a color image comprising first directing a wide band white printing light through an image to expose all emulsions of the sensitized material until the exposure to at least one of the three primary colors is completed, while simultaneously sampling the printing light reaching the sensitized material with three photoelectric means each responsive to one of the narrow band primary colors, then changing the printing light from a wide band white light to a narrow band colored light to complete the exposure to a color requiring additional exposure and simultaneously modifying the sampling means to compensate for the change in the effective emulsion sensitivity of the sensitized material which occurs with a change in the band width of the exposing light, then changing the printing light to another narrow band color required to complete an exposure not previously completed.

2. The method of exposing a photographic multicolor sensitized material from a color image comprising directing a wide band white printing light through an image and a basic tinting filter to expose all emulsions of the sensitized material until the exposure to at least one of the three primary colors is complete while simultaneously sampling the printing light reaching the sensitized material with three photoelectric means each responsive to one of the narrow band primary colors, then removing the basic tinting filter and simultaneously inserting a primary color filter into the printing light to expose a color requiring additional exposure, and also simultaneously modifying the sampling means to compensate for the change in the effective emulsion sensitivity of the sensitized material, then replacing the primary color filter with a second primary color filter of a color not previously satisfied.

3. The method of exposing a photographic multicolor sensitized material from a color image consisting in directing a wide band white printing light through an image and a basic tinting filter to expose all emulsions of the sensitized material until the exposure to at least one of the three primary colors is complete while simultaneously sampling the printing light reaching the sensitized material with three photoelectric means each responsive to one of the narrow band primary colors, then removing the basic tinting filter and simultaneously changing the printing light to one of the primary colors requiring additional exposure until such exposure is completed and also simultaneously modifying the sampling means to compensate for the change in the effective emulsion sensitivity of the sensitized material, then changing the printing light to a primary color required to complete an exposure not previously completed.

4. The method of exposing a photographic multicolor sensitized material from a color image comprising directing a wide band white printing light through an image, simultaneously sampling the printing light reaching the sensitized material with a plurality of photoelectric means each responsive to one of the narrow band primary colors, compensating during the sampling for the differences in effective emulsion sensitivity between white light and the primary colors, and changing the printing light to a narrow band color required to complete an exposure not previously completed in accordance with the results of said sampling as influenced by said compensating step.

References Cited by the Examiner

UNITED STATES PATENTS

| | | | |
|---|---|---|---|
| 1,208,739 | 12/1916 | Brewster | 96—2 |
| 2,352,914 | 7/1944 | Rackett | 96—23 X |

(Other references on following page)

UNITED STATES PATENTS

| | | | |
|---|---|---|---|
| 2,388,842 | 11/1945 | Hanson | 96—23 X |
| 2,438,303 | 3/1948 | Simmon | 96—23 X |
| 2,565,399 | 8/1951 | Simmon | 88—24 |
| 2,566,277 | 8/1951 | Williams et al. | 96—23 |
| 2,571,697 | 10/1951 | Evans | 96—23 |
| 2,777,359 | 1/1957 | Debrie | 88—24 |
| 2,997,389 | 8/1961 | Boon | 96—23 |
| 3,100,419 | 8/1963 | Clapp | 96—23 |

FOREIGN PATENTS

| | | |
|---|---|---|
| A 21,328 | 8/1956 | Germany. |
| 805,891 | 12/1958 | Great Britain. |

NORMAN G. TORCHIN, *Primary Examiner.*

HAROLD N. BURSTEIN, PHILIP E. MANGAN,
*Examiners.*

R. A. BURROUGHS, J. T. BROWN,
*Assistant Examiners.*